Feb. 4, 1969  A. F. STEIERT ET AL  3,425,698
MAGNETIC AND GRAVITY ACTUATED INDEXABLE CHANCE SPINNER
Filed Aug. 31, 1966  Sheet 1 of 3
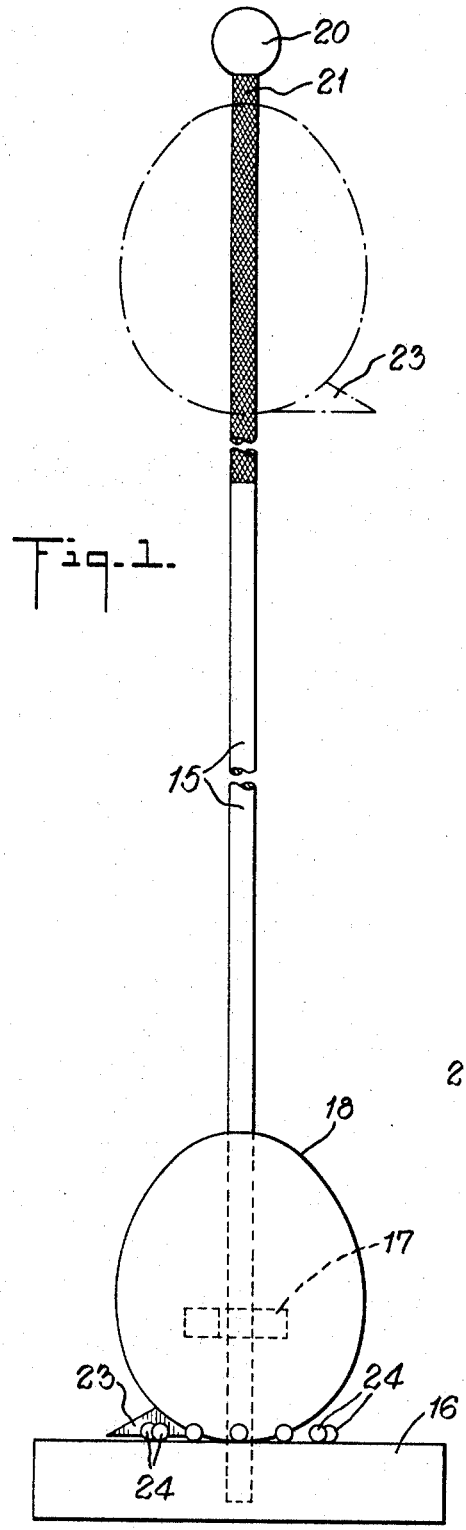
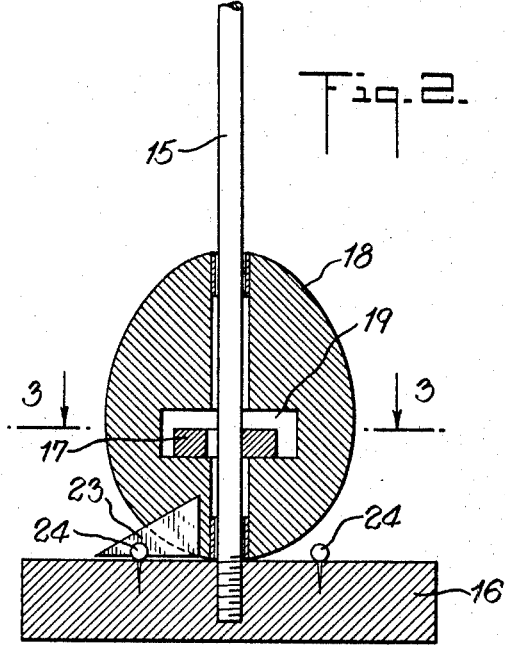
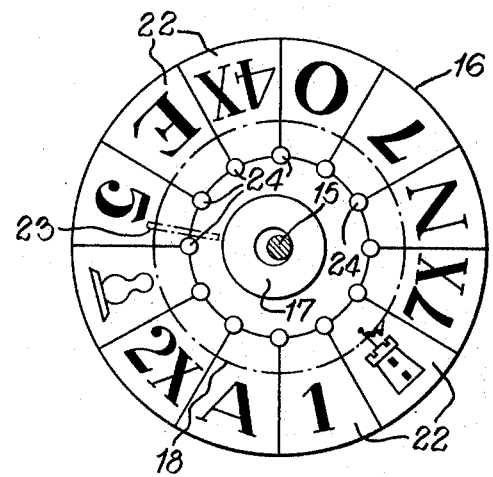
INVENTORS
ALOIS F. STEIERT
EARLE STEIERT
BY
*Philip S. McLean*
ATTORNEY

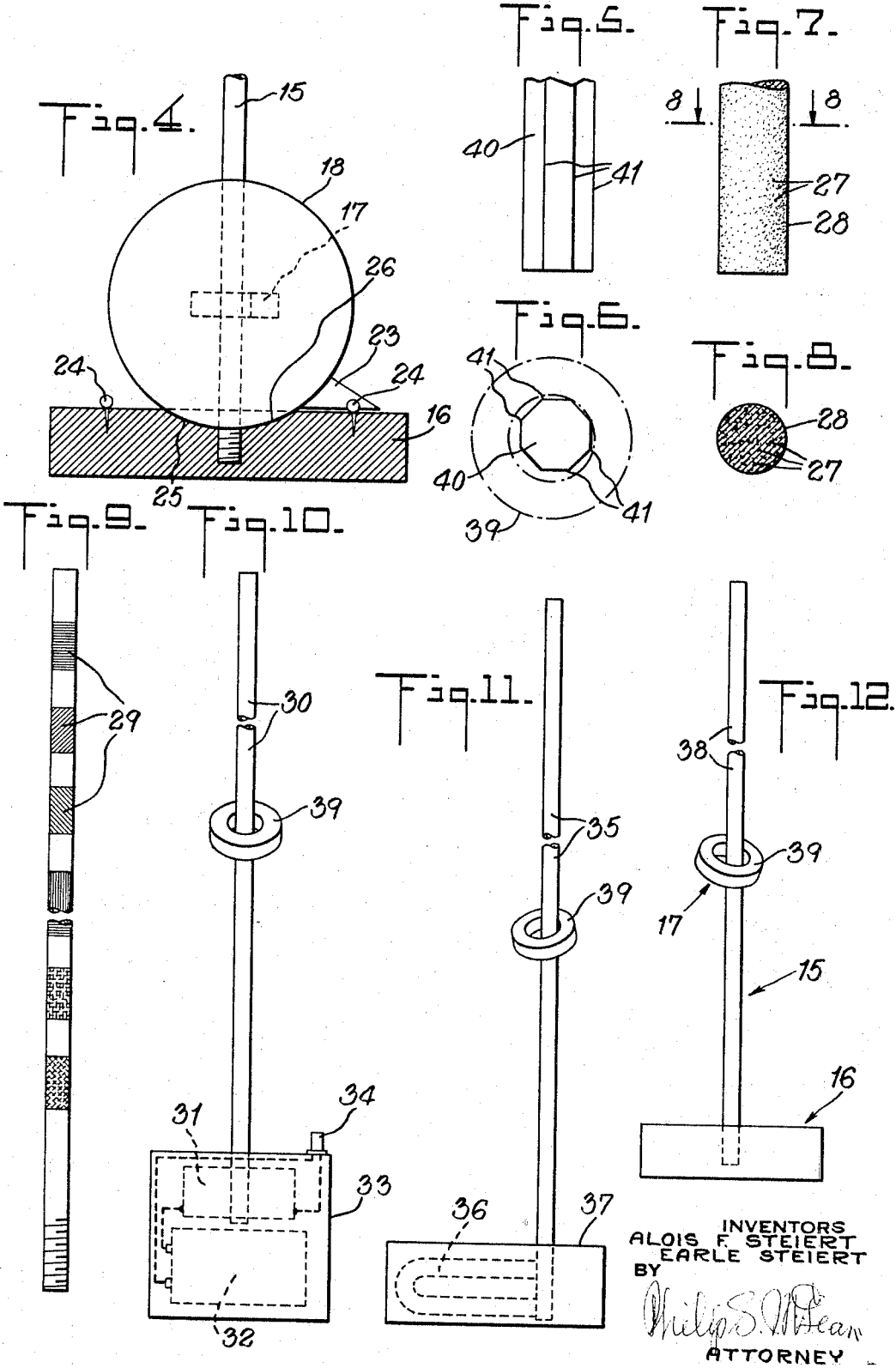

United States Patent Office 3,425,698
Patented Feb. 4, 1969

3,425,698
MAGNETIC AND GRAVITY ACTUATED INDEXABLE CHANCE SPINNER
Alois F. Steiert, 427 W. Bristol St., Philadelphia, Pa. 19140, and Earle Steiert, 271 Linden Lane, Merion Station, Pa. 19066
Filed Aug. 31, 1966, Ser. No. 581,132
U.S. Cl. 273—141          12 Claims
Int. Cl. A63h 33/26, 1/00, 15/00

The invention herein disclosed relates to magnetic games and toys of the type disclosed in U.S. Patent No. 3,217,446 of Nov. 16, 1965, in which a permanent magnet of annular form is caused to rotate in gyratory fashion about a rod of magnetizable material.

Special objects of the present invention are to provide devices of this character, of simple, inexpensive and attractive form, interesting in their action and which, as embodied in games, will partake of the unpredictability of the gyratory evolutions of the spinner, but give definite final end results in the matter of scoring results of the game.

Other important objects of the invention are to embody the invention in different magnetic couples or combinations, as best suited to meet different requirements.

The foregoing and other desirable objects have been accomplished by novel combinations and arrangement of elements, embodying a magnetic couple, with one element magnetically energized as by being a permanent magnet or energized through the medium of a permanent magnet or magnetizing coil and the other element as a magnetized or magnetizable body and with one of such elements in annular form, rotatable about the other.

Other features of the invention involve various combinations of stop projections and game indicia to carry out the gaming principle.

These may be in the form of stops and indicia on the relatively rotatable spinner and stationary game dial at one or both the ends of the rod about which the spinner rotates.

Various other novel combinations are set forth or will appear in the course of the following specification.

The drawings accompanying and forming part of the specification illustrate a number of different embodiments of the invention; but construction and arrangement may be further modified and changed within the true spirit and scope of the invention; as hereinafter defined and claimed.

FIG. 1 is a side elevation of the invention as embodied in a game of chance; the broken lines indicating the spinner element raised to the top of the supporting rod or post.

FIG. 2 is a broken sectional view taken through the spinner and base portion of the device.

FIG. 3 is a horizontal sectional view on substantially the plane of line 3—3 of FIG. 2 showing the spinner in broken lines and the base in plan.

FIG. 4 is a broken sectional detail similar to FIG. 2 illustrating a modification in which the spinner is arranged to come to rest in a depression in the base.

FIG. 5 is a broken side elevation illustrating a hexagonal cross section form of rod or tube for the annular spinner.

FIG. 6 is a plan or end view of the hexagonal rod or tube with broken lines indicating how the surrounding annular element may cooperatively engage several angular edges of the rod or tube at one time.

FIGS. 7 and 8 are elevation and cross sectional views respectively of a cylindrical form of rod made up of magnetic or magnetizable fragments in a plastic or other host material.

FIG. 9 is a broken side elevation of rod having differently textured or formed sections, which may be employed entirely or in part.

FIG. 10 is a broken front elevation of a game or toy having a rod magnetized by a coil on the bottom of the same, with coil and energizing battery enclosed within a supporting base.

FIG. 11 is a similar view showing a rod magnetized by a permanent horseshoe magnet.

FIG. 12 is a like view, illustrating a permanent magnet form of rod.

Figure 13:
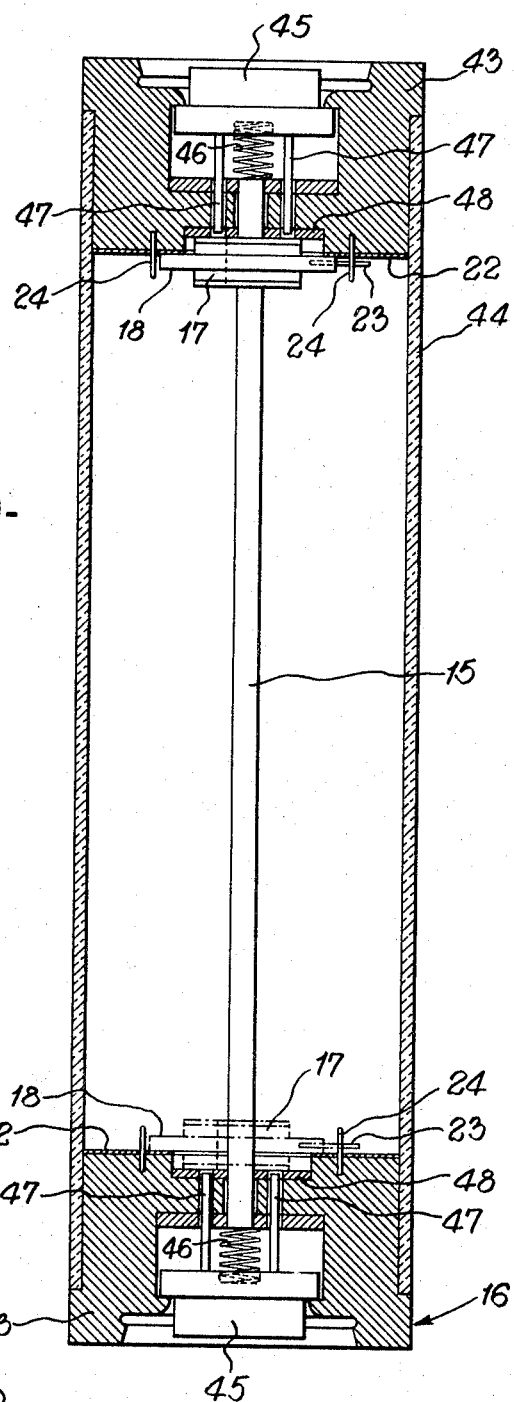
FIG. 13 is a broken sectional detail of a modification in which the spinner rotates in a double ended transparent tube and is released at opposite ends by push buttons.

In the several forms of the invention illustrated, there is a supporting rod 15 mounted in upstanding relation on a suitable supporting base 16 and a spinner in the form of an annular member 17 of sufficiently larger diameter than the rod to freely rotate in angled gyratory and gravitational movement about the rod.

The magnet may be enclosed within a body 18 of spherical, elliptical or other ornamental or desired shape, free to rotate gravitationally about the rod.

The annular element 17 may be loosely confined in a chamber 19, FIG. 2, provided for it in the body.

Figure 14:
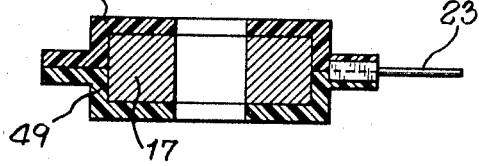
FIG. 14 is a cross sectional detail of a spinner.

Also, this annular element may be tightly encased in the rotatable body structure, such as the flight disk, FIGS. 13 and 14.

The rod is shown as having a finial 20, FIG. 1, at the top to prevent accidental separation of the body member and it is further shown as having a knurled or roughened upper portion 21 to implement and guide the spinner at the start of the descending movement.

The base is shown as carrying a dial with suitable score markings or delineations 22, and the body of the spinner as having an index or pointer 23 to register with the different delineations when it rests on the dial.

There are provided in the illustration, upstanding projections or "stops" 24 at the divisions between the individual markings, preferably rounded as indicated, which if struck by the pointer will deflect it to one side or the other onto the score marking at that side.

Thus, despite the unpredictability in number and direction of revolutions in the gyratory uncontrolled downward flight, the pointer will always come to rest on a definite score marking on the dial.

The dial and base may be suitably shaped and formed, more or less in accordance with the shape and form of the spinner, and for the type of game.

In FIG. 4, the base is shown as hollowed at 25 to provide a seat or cavity 26 for the rotating body member.

The rod may be a solid member or be tubular in form, the term "rod" being used to include both such structures.

FIGS. 5 and 6 illustrate a hexagonal form of rod 40; a feature of this being that it provides a number of sharp angled corners 41 for engagement by the rotating spinner; contributing to the gyratory flight of the annular element.

FIGS. 7 and 8 show how a rod of circular or other cross section may be made up of magnetic or magnetizable fragments 27, embedded in plastic or other form of host material 28.

FIG. 9 shows how the rod may be made up, either wholly or in part, of differently textured or formed sections 29 designed to create greater interest or greater variations in the operation of the spinner.

FIG. 10 illustrates a rod 30 of magnetizable material energized by a surrounding magnetizing coil 31 about the lower end of the same and supplied with electric current from a rechargable battery 32, or the like, with coil and battery concealed in a base 33, and controlled by a push button switch 34.

FIG. 11 illustrates the rod 35 as of magnetizable material, energized by a permanent horseshoe magnet 36, concealed in the base 37.

The rod itself is a permanent magnet 38, in FIG. 12.

It will be apparent that the invention involves the magnetization of either or both the rod and the annulus.

In FIGS. 10, 11 and 12, the rod is the magnetically energized element, either permanetly so, as in FIG. 12, or energized by external sources, FIGS. 10 and 11.

In these three instances, the annular spinner element 39 may be either a permanent magnet or simply a form of magnetizable material, with an annular center.

The rods of various shapes and forms, such as illustrated in FIGS. 5 and 7, also may be of permanent or externally energized form.

The body of the spinner may be made up in many different fancy and attractive shapes for amusement and entertaining purposes and many different arrangements of scoring or game action instruction may be employed.

FIG. 13 shows how the game may be made up with a base 43, carrying game or scoring delineations, at each end of the rod, held in properly spaced relation by a transparent cylindrical casing 44, of clear plastic or the like.

FIG. 14 is a sectional detail of the spinner employed in the FIG. 13 form of the invention.

Also this view illustrates the feature that push buttons 45 may be provided at each end supported by springs 46 and provided with extending prongs 47, which, when a button is pressed, will separate the magnetic flight disk from a metal holding disk 48 seated in the end piece.

With this form, the device may be reversed end for end after each play, with the spinner remaining attached to the upper end piece until a player is ready to start again, by pressing the button in the end piece.

The invention provides all the attraction of a game of chance, the motion of which is entirely uncontrolled and unpredictable, but in which final results will always be definite.

The scoring stops on one of the relatively rotatable elements may be spaced in any regular or irregular manner and the index on the other member cooperable with the scoring stops may be in any suitable shape or form.

While usually only the spinner or the rod may be in the form of a permanent magnet, it is contemplated that both these elements may be permanent magnets.

In the simplest forms of the invention, the spinner may be made up just of an annular member seated in a disk-like base, but this base may be in various forms of housings or encasements to suit different game or other requirements.

For some purposes the indicia may be on the body of the spinner, with stops between adjoining indications or designations and the indexing pointer means be on one or both end pieces.

The spinner may be made up as shown in FIG. 14 of upper and lower hollow plastic sections 49 enclosing and joined together over the annular magnet and securing a projecting pointer.

What is claimed is:

1. A magnetic spinning game device or game comprising the combination of a magnetic couple made up of a rod and an annular spinner about the same and free to pursue a gyratory course of downward flight about the rod,
   one element of said magnetic couple being magnetically energized and the companion element being magnetizable whereby to effect said gyratory travel of the spinner in respect to the rod,
   a base having a game control scoring dial on at least one end of said rod having scoring indicia thereon,
   separating stop projections on said dial between the individual indices, and
   said spinner having an encasement from which an indexing pointer projects for disposition between with two of said separating stop projections on said dial at completion of the spinner's descent about the rod.

2. The invention according to claim 1 in which said spinner is in the form of an annular permanent magnet and the rod is in the form of magnetizable material.

3. The invention according to claim 1 in which said spinner is annular in form and composed of magnetizable material and the rod is in the form of a permanent magnet.

4. The invention according to claim 1 in which both said spinner and said rod are permanent magnets.

5. The invention according to claim 1 in which said rod is of magnetizable material and in which external magnetizing means are associated with said rod.

6. The invention according to claim 1 in which said rod is of host material with magnetic fragments embedded therein.

7. The invention according to claim 1 in which said rod is of plastic host material with magnetizable fragments embedded therein.

8. The invention according to claim 1 in which said rod is knurled, for at least some portion of its length.

9. The invention according to claim 1 in which said rod is of angular cross section providing a plurality of angular corners for engagement by said annular spinner.

10. The invention according to claim 1 with a base at each end of the rod,
    material on each base engageable by and to which said spinner is attracted, and
    push buttons on said bases for separating the spinner from said material.

11. A magnetic game device comprising a magnetic couple consisting of:
    a rod element having a supporting base at one end, and
    a spinner element rotatable about said rod element into engagement with said base,
    one of said elements being magnetically energized, and the other of said elements being of material magnetically attracted to said first element,
    game scoring indicators on one of said elements, and
    an indexing pointer on the other of said elements in cooperative registering relation with said indicator in said supported position of the spinner on the base, and
    stop means between adjoining indicators and positioned in line with and engageable by said pointers for effecting definite registration of said pointer between two of said indicators at the end of the travel of the spinner element over the rod element.

12. A game device comprising:
    a magnetic couple consisting of a rod member and an annular member freely rotatable about said rod member, one of said members of magnetically attracted material and the other of said members being a magnetized member,
    said rod member having a supporting base at one end, game scoring designations on said annular member or said base,
    stop means separating adjoining scoring designations from each other, and
    indexing means on the other of said annular member and said base engageable with said stop means to relatively position said annular member and said base with said indexing means definitely in register with one of said scoring designations.

References Cited

UNITED STATES PATENTS

| | | | |
|---|---|---|---|
| 1,038,756 | 9/1912 | Hyde | 273—141 |
| 2,417,565 | 3/1947 | Norvell | 46—47 |
| 2,423,198 | 7/1947 | McClure | 46—47 |
| 2,486,752 | 11/1949 | Michael | 273—141 |
| 2,961,796 | 11/1960 | Davis | 46—236 |
| 3,217,446 | 11/1965 | Steiert | 46—242 |

FOREIGN PATENTS

| | | |
|---|---|---|
| 646,214 | 6/1937 | Germany. |
| 927,975 | 5/1955 | Germany. |

ANTON O. OECHSLE, *Primary Examiner.*

A. W. KRAMER, *Assistant Examiner.*

U.S. Cl. X.R.

46—47, 234, 236, 242